July 23, 1929.  W. S. GATTRELL  1,721,592
POWER TRANSMISSION FOR NONREVERSIBLE MOTORS
Filed March 19, 1927  2 Sheets-Sheet 1
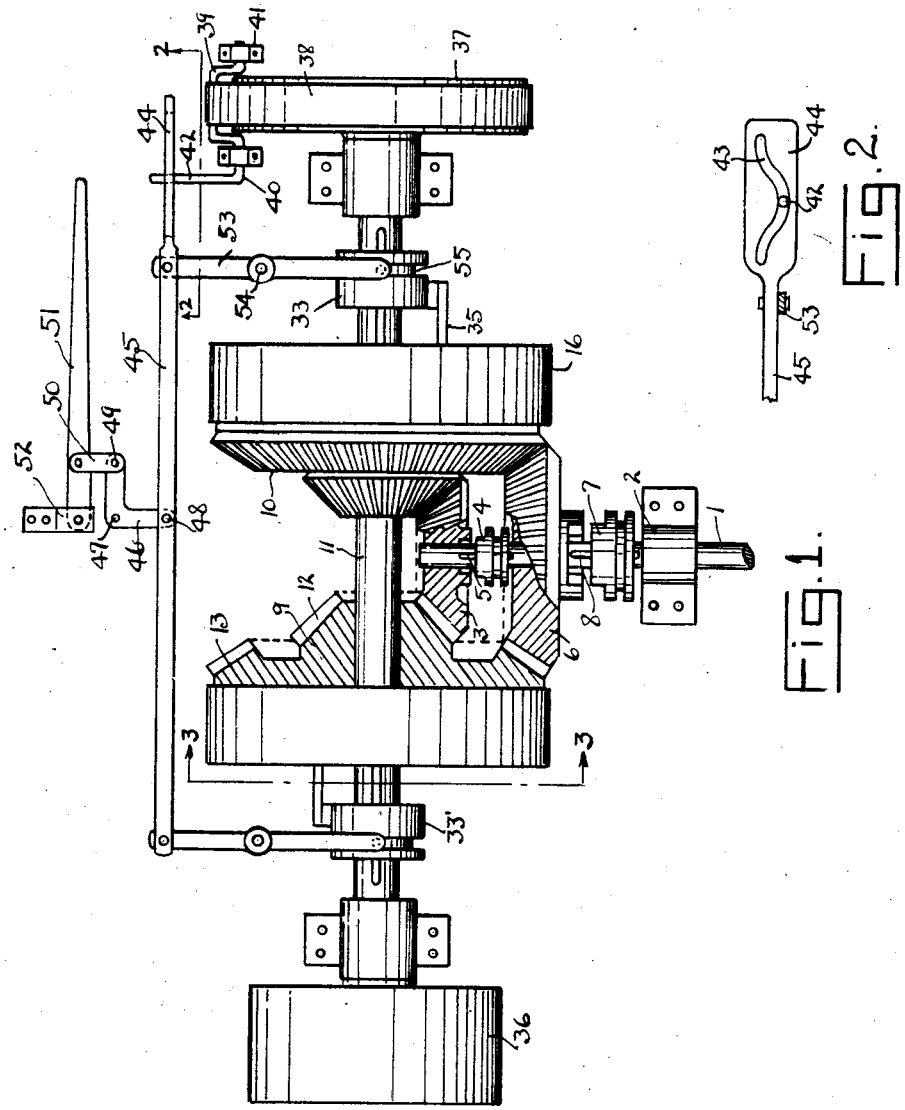
William S. Gattrell, Inventor
By Jesse R. Stone
Attorney July 23, 1929. W. S. GATTRELL 1,721,592
POWER TRANSMISSION FOR NONREVERSIBLE MOTORS
Filed March 19, 1927 2 Sheets-Sheet 2
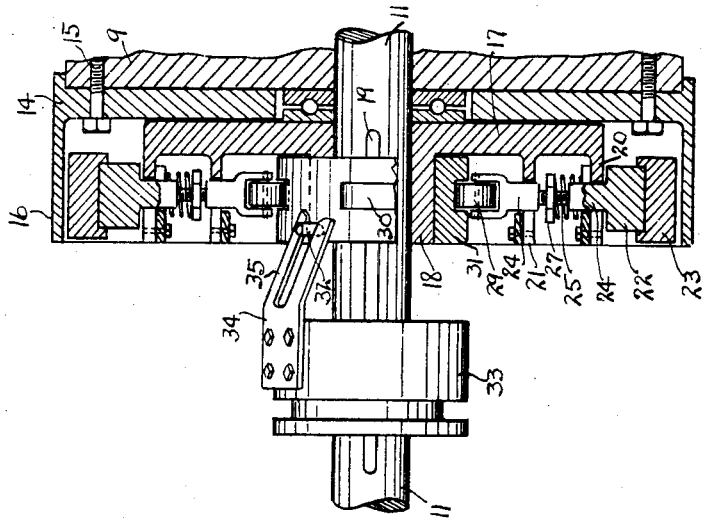
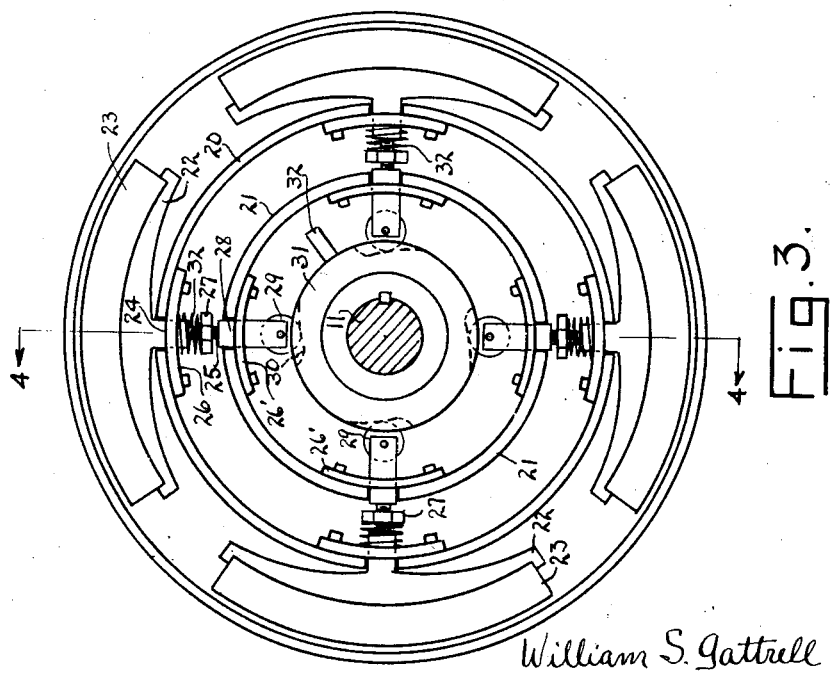
William S. Gattrell Inventor
By Jesse R. Stone
Attorney Patented July 23, 1929.

1,721,592

UNITED STATES PATENT OFFICE.

WILLIAM SLOVER GATTRELL, OF LEES SUMMIT, MISSOURI.

POWER TRANSMISSION FOR NONREVERSIBLE MOTORS.

Application filed March 19, 1927. Serial No. 176,663.

My invention relates to a transmission mechanism by means of which a member may be driven from a non-reversible motor with a plurality of speeds forward and reverse.

In the usual type of power transmission, a more or less complicated series of gears, set upon parallel shafts and adapted to be shifted relative to each other, are necessary in order to get a plurality of speeds and a change of direction of the power delivered to the mechanism. In handling this common type of transmission, it is ordinarily necessarily to employ a plurality of operating levers and a series of positions of the levers in order to control the speed and direction of the driven member.

It is an object of my invention to provide a simplified form of transmission mounted upon a single shaft at right angles to the drive shaft and to control the change in direction by one operating lever. It is desired to simplify the transmission device over the present type of structure and to make the operation thereof rapid and the control easy.

It is also an object to provide a clutch that is sensitive to the touch and safe to handle for the operator. It is also an object to make the operation more even and uniform and to make the repair and adjustment of the parts by the operator simple and easy of access.

The further objects and advantages of the device residing in the particular construction and arrangement of the parts will be set out more clearly in the specification which follows.

Referring to the drawing herewith, Fig. 1 is a top plan view of an installation involving my invention, certain parts being broken away for greater clearness. Fig. 2 is a view taken in section on the line 2—2 of Fig. 1. Fig. 3 is a transverse section on the line 3—3 of Fig. 1. Fig. 4 is a broken vertical section on the line 4—4 of Fig. 3. Like numerals of reference are employed to designate like parts in all the views.

In carrying out my invention, I have shown a drive shaft 1, which is understood as being driven from any source of power in which a non-reversible motor is employed. The said shaft is journaled in a bearing 2 at its forward end and has on the end thereof projecting beyond the bearing a plurality of beveled gears attached thereto. The forward gear 3 is mounted idly on the shaft and is of comparatively small diameter. It is adapted to be secured to the shaft for rotation therewith by means of a clutch 4, keyed slidably to the shaft, as shown at 5. Another gear 6, materially larger in diameter than the gear 3, is secured upon the shaft 1 in the same manner as is the gear 3. It is idly mounted on the shaft and adapted to be clutched thereto by means of the dental clutch 7, which is itself keyed slidably to the shaft by means of the key 8.

The two beveled gears 3 and 6 are positioned to engage with two opposite gear wheels 9 and 10. Said gear wheels 9 and 10 are similar in construction, both of said gear wheels facing inwardly toward the shaft 1. They are idly mounted upon a driven shaft 11, placed at right angles to the drive shaft 1. Each gear wheel has two separate gear rings thereon, a smaller gear ring 12 positioned to engage with the gear 3 on the drive shaft, and a larger gear ring 13 positioned to engage with the gear 6 on the drive shaft. Both of these gear rings are integral with the body of the gear wheel and of course rotate together. It will be noted that each of the opposite gear wheels 9 and 10 engage with the gears 3 and 6 so as to be rotated simultaneously but in opposite directions.

Either of said gear wheels 9 or 10 may be separately engaged with the shaft 11 upon which it is mounted by means of a clutch, the construction of which will now be described. The gear wheels are connected on their outer sides with a clutch drum 14 by means of cap screws 15, as shown in Fig. 4. When the gear wheels rotate the drums 14 will hence rotate therewith. The drums 14 have an outwardly extending flange 16, the inner surface of which forms a friction member to be engaged by the clutch.

The clutch comprises a radial disc plate 17, formed upon the inner end of a hub member 18, which is keyed to the shaft 11 by means of the key 19. Said clutch disc 17 has two outwardly extending rims or flanges 20 and 21 which are circular in shape and spaced outwardly from the shaft 11.

These two flanges 20 and 21 form a slidable bearing support for a plurality of clutch members of which I have shown four, 11 as seen in Fig. 3. These clutch members include an outer shoe 22, each having a friction block 23 thereon arcuate in shape and adapted to engage with the inner face of the drum 16, the friction block being clamped detachably within the shoe 22. Said shoe 22 is formed arcuate in shape and has a central inwardly projecting pin 24 thereon, which is preferably square in cross section and extending through the body of the flange 20. The inner end of the pin 24 has a central threaded recess therein to receive an expansion bolt 25.

The pin 24 on the shoe extends through a bearing plate 26 bolted to the inner side of the flange 20, said plate having a squared opening therein to receive the pin. Centrally of the threaded expansion bolt 25 is a hexagonal flange 27 integral with the bolt and adapted to rotate the same. The opposite ends of the expansion bolt 25 are threaded in opposite directions, the inner end of the bolt being screwed within the head of a block 28, so that the rotation of the bolt will tend to act as a turnbuckle to vary the distance between the shoe 22 and the block 28.

The block 28 extends through the drum or flange 21 and through a bearing plate 26' thereon and has its inner end forked to receive a roller 29 adapted to bear within a recess 30 within a cam wheel 31. The roller 29 is held resiliently inward toward the cam member by means of a spring 32 fitting about the expansion bolt 25 and bearing at its outer end against the plate 26 and at its inner end against the flange 27 upon said bolt.

The cam wheel 31 has recesses 30 therein adjacent each of the rollers 29. These recesses have the inner faces thereof eccentric with relation to the shaft 11 and thus the rotation of the cam wheel 31 is enabled to force the rollers 29 outwardly away from the shaft 11 when the cam wheel is rotated in one direction and to allow the spring 32 to force said rollers nearer the shaft when the said cam wheel is rotated in the opposite direction. It is to be understood that the cam wheel 31 is rotatable freely upon the hub 18 of the disc plate 17. This will be understood from Fig. 4.

To provide for the partial rotation of the cam wheel upon the said hub, a radially extending pin 32' is formed upon the said ring. A clutch ring 33 is mounted upon the shaft 11 and adapted to slide toward and away from the clutch member and the cam wheel just described. It is slidable upon the key 19 and is rotatable at all times with the shaft. The said clutch 33 has a plate 34 secured thereon at one side with a forked end 35 extending toward the pin 32', the said pin fitting slidably between the two fingers of the forked end of the plate. This operating plate is bent at an angle to the clutch member and to the cam ring. The clutch and the cam ring are of approximately the same outer diameter. As will be seen in Fig. 4, the moving the clutch member 33 toward the cam ring will cause the rotation of the said ring in one direction and its movement outwardly away from the cam ring will move it back in the opposite direction. The movement of the clutch will, therefore, cause a partial rotation of the cam ring so as to to advance or withdraw the clamping shoe 22 from the drum 16.

At one end of the shaft 11 is a pulley or other similar power transmitting means, shown at 36. Through this pulley any driven member may be operated.

At the opposite end of the shaft 11 is a brake drum 37. A brake band 38 on this drum is adapted to be operated through a crank arm 39 upon a crank shaft 40, mounted in bearings 41 upon any convenient support. At the inner end of the crank shaft 40 is a rod or lever 42, which projects through a cam slot 43 in a plate 44 at one end of an operating bar 45. The shape of the slot 43 will be seen in Fig. 2. It is bowed laterally at the center, the two ends being in alignment with each other, and it will be seen that when the lever arm 42 is moved from its central position toward either end, it will be moved laterally to an extent equal to the whole distance between the bowed center and the aligned ends of the slot 43. This movement is sufficient to release or set the brake band 38 upon the drum 37.

The operating bar 45 may be moved longitudinally for the operation of the clutches by means of a bell crank 46, pivoted at 47, one end being connected at 48 to said bar and the other end being connected at 49 by means of a link 50 to an operating lever 51, said lever 51 being fulcrumed at one end upon a bracket 52. It will be obvious that when the handle of this lever 51 is moved outwardly away from the shaft 11, as shown in Fig. 1, the bar 45 will be moved to the right of its present position.

The operating bar 45 is adapted to move the clutches 33 and 33' so as to engage either of the clutches with the gear wheels adjacent thereto, through means of connecting levers 53. Said levers are pivoted between their ends at 54, the inner ends of said levers having engagement within the grooves 55 of said clutches.

In operating the device, it will be obvious that the gear wheels 9 and 10 may be driven from the shaft 1 through means of the gear 6 on said shaft by the operation of the clutch 7 and, when thus driven, the gear wheels 9 and 10 will move at a comparatively slow speed. If, however, the clutch 7 is disengaged and the clutch 4 moved to engage the gear 3 with the drive shaft, the gear wheels 9 and 10 will be rotated at a somewhat higher speed.

When the gears are thus rotated, one in one direction and the other in the opposite direction, it will be seen that the shaft 11 may be engaged with either of the said gear wheels by operating the clutch adjacent thereto. This may be done by means of the lever 51. If the lever 51 is moved outwardly away from the shaft 11, it will move the operating bar 45 to the right, thus throwing the brake arm 42 from its central position, shown in Fig. 2, toward the outer end of the slot 43 and disengaging the brake from the drum 37. Simultaneously with this releasing of the brake the clutch 23 will be moved toward the adjacent clutch member, the arms 35 thereon engaging the pin 32 of the cam wheel and rotating it so as to force the rollers 29 outwardly so as to set the friction member 33 against the drum 16 and thereby locking the gear wheel through the clutch member to the shaft 11 and rotating the said shaft with the gear wheel. It will be obvious that if the lever 51 were moved in the opposite direction, the clutch would be released, the brake set to stop the shaft and the opposite clutch could then be engaged to rotate the said shaft in the opposite direction, and when this position is reached, the brake will be again released.

It will be seen that the operation of the power transmission is an exceedingly simple one, easily operated and not liable to get out of order. Furthermore, the parts are easily accessible and may be adjusted or lubricated with little difficulty at any time. A single operating lever is sufficient to control the reversing mechanism and apply the brake. No other lever need be operated except such as is necessary to throw either of the clutches 4 or 7 to regulate the speed and it will be obvious that the same speeds will be available in either direction of rotation of the driven shaft. Owing to the manner in which the clutches are operated, it will be obvious that little power will be necessary upon the operating lever to cause the engagement of the gear wheels with the shaft. The clutch is therefore sensitive and easy to operate.

The further advantages of the device will be obvious to those skilled in the art.

What I claim as new and desire to protect by Letters Patent is:

1. In a device of the character described, a drive shaft, a driven shaft, opposed gear wheels mounted idly on said driven shaft, means operatively engaging said gear wheels to said drive shaft to drive said gear wheels in opposite directions and at various gear ratios, a brake on said driven shaft, and means to clutch either selected one of said gear wheels to said shaft and to simultaneously release said brake.

2. In a device of the character described, a drive shaft, a driven shaft, opposed gear wheels mounted idly on said driven shaft, means operatively engaging said gear wheels to said drive shaft to drive said gear wheels in opposite directions and at various gear ratios, a brake on said driven shaft, and means to clutch either selected one of said gear wheels to said shaft and to simultaneously release said brake, said means acting to set said brakes when both said gear wheels are loose on said shaft.

3. In a drive of the character described, a driven shaft, a gear wheel idle thereon, means to drive said gear wheel at a plurality of speeds, a clutch drum extending laterally from said gear wheel, a plurality of radially movable clutch shoes within said drum and fixed relative to said shaft, and a cam ring on said shaft adapted, when rotated, to force said clutch shoes into contact with said drum for the purpose described, and means slidable longitudinally on said shaft to rotate said cam ring, said means including a collar keyed to said shaft and an angularly extending arm for engagement with said ring.

4. In a power transmission device, a drive shaft, a plurality of idle gears thereon, means to separately connect said gears to said shaft, a driven shaft, a plurality of idle gears thereon, means to separably connect said gears to said driven shaft; teeth on each of said gears adapted to mesh with teeth of each of the other gears, and means for operating said connecting means.

5. In a power transmission device, a drive shaft, a plurality of idle gears thereon, means to separately connect said gears to said shaft, a driven shaft, a plurality of idle gears thereon, means to separately connect said gears to said driven shaft; teeth on each of said gears adapted to mesh with teeth of each of the other gears, and means for operating said connecting means whereby said driven shaft may be driven either forward or reverse at different speed ratios.

In testimony whereof I hereunto affix my signature this 10th day of March, A. D. 1927.

WILLIAM SLOVER GATTRELL.